(12) United States Patent
Kato

(10) Patent No.: US 6,377,382 B1
(45) Date of Patent: Apr. 23, 2002

(54) SCANNING TABLE ASSEMBLY

(75) Inventor: Shuichi Kato, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/595,093

(22) Filed: Jun. 16, 2000

(30) Foreign Application Priority Data

Jun. 18, 1999 (JP) .......................................... 11-172769

(51) Int. Cl.$^7$ .............................................. G02B 26/08
(52) U.S. Cl. ...................... 359/212; 359/201; 358/474; 358/483; 358/494; 358/497
(58) Field of Search ................................. 359/196, 198, 359/212, 201, 871; 399/221, 220, 202; 355/67, 68; 358/494, 474, 483, 497

(56) References Cited

U.S. PATENT DOCUMENTS 3,752,558 A * 8/1973 Lloyd .......................... 359/198

* cited by examiner

*Primary Examiner*—James Phan
(74) *Attorney, Agent, or Firm*—Dickstein Shapiro Morin & Oshinsky LLP

(57) ABSTRACT

A book scanner includes a scanning table assembly having a full-speed scanning table and a half-speed scanning table moving on a pair of rails in association with each other. A first mirror mounted on the full-speed scanning table reflects light from a document to second and third mirrors to be incident on a CCD unit. The full-speed and half-speed scanning tables are supported at three points of the rails whereas some of the mirrors are supported at four points of a corresponding table. A stable image can be obtained due to substantially no distortion in the mirror surface which results from the stable posture of the tables supported at three points thereof.

12 Claims, 7 Drawing Sheets

SCANNING TABLE ASSEMBLY

BACKGROUND OF THE INVENTION (a) Field of the Invention

The present invention relates to a scanning table assembly and, more particularly, to a scanning table assembly for use in a image-scanning system for imaging a document.

(b) Description of the Related Art

An imaging system in a scanner, a copying machine or a facsimile machine generally includes a scanning table assembly for scanning a document to obtain an image of the document, and a CCD unit. The scanning table assembly generally includes a full-speed scanning table extending in a main scanning direction and moving reciprocally in a sub-scanning direction, and a half-speed scanning table extending in the main scanning direction and moving reciprocally in the sub-scanning direction at a speed substantially half the speed of the full-speed scanning table.

The full-speed scanning table mounts thereon a light source for irradiating the document for scanning thereof and a single mirror for reflecting the light reflected from the document. The half-speed scanning table has a pair of mirrors for guiding the light reflected by the mirror mounted on the full-speed scanning table to be incident onto the CCD unit.

The full-speed scanning table is coupled to a pair of wires, driven by a drive mechanism, for tagging the full-speed scanning table along a pair of rails extending in the sub-scanning direction.

The half-speed scanning table moves so that the path length of the light reflected from the document is maintained at a constant. The half-speed scanning table is coupled to the full-speed scanning table via the wires.

The full-speed scanning table has four sliders slidably supported on the pair of rails, whereas each mirror is supported on the corresponding table at three points thereof so that the reflective surface of the mirror is easily adjusted for the angle of the reflective surface.

In the configuration as described above, it is liable that one of the four points of the full-speed scanning table or half-speed scanning table does not contact with the rail, with the remaining three points contact with the rails, whereby the table is in an unstable posture. This is especially true, if the pair of rails does not have an excellent planarity. The unstable posture of the scanning table causes vibration of the scanning table during the scanning movement thereof and degrades the image quality obtained by the image-scanning system.

For preventing the vibration of the scanning table, it may be considered sufficient that the rigidity of the full-speed scanning table be lowered to have some flexibility. However, such flexibility in fact lowers the accuracy of the angle of the reflective surface of the mirror, which is undesirable.

SUMMARY OF THE INVENTION

In view of the above it is an object of the present invention to provide a scanning table assembly for use in an imaging system, which is capable of affording an excellent image for the imaging system by preventing the vibration of the table.

The present invention provides a scanning table assembly in an imaging system including a full-speed scanning table having a light source for irradiating a document to be scanned and a first mirror for reflecting light reflected from the document, a half-speed scanning table having second and third mirrors for consecutively reflecting light reflected from the first mirror, the full-speed and half-speed scanning tables moving on a pair of rails in association with each other so that a path length of light reflected from the document toward a CCD unit is maintained substantially at a constant, at least one of the full-speed and half-speed scanning tables being supported at three points of the rails.

In accordance with the table assembly of the present invention, the three-point support configuration of the at least one of the scanning tables affords a stable posture of the scanning table so that an excellent image quality is obtained by the imaging system.

The above and other objects, features and advantages of the present invention will be more apparent from the following description, referring to the accompanying drawings.

PREFERRED EMBODIMENT OF THE INVENTION

Now, the present invention is more specifically described with reference to accompanying drawings.

Figure 1:
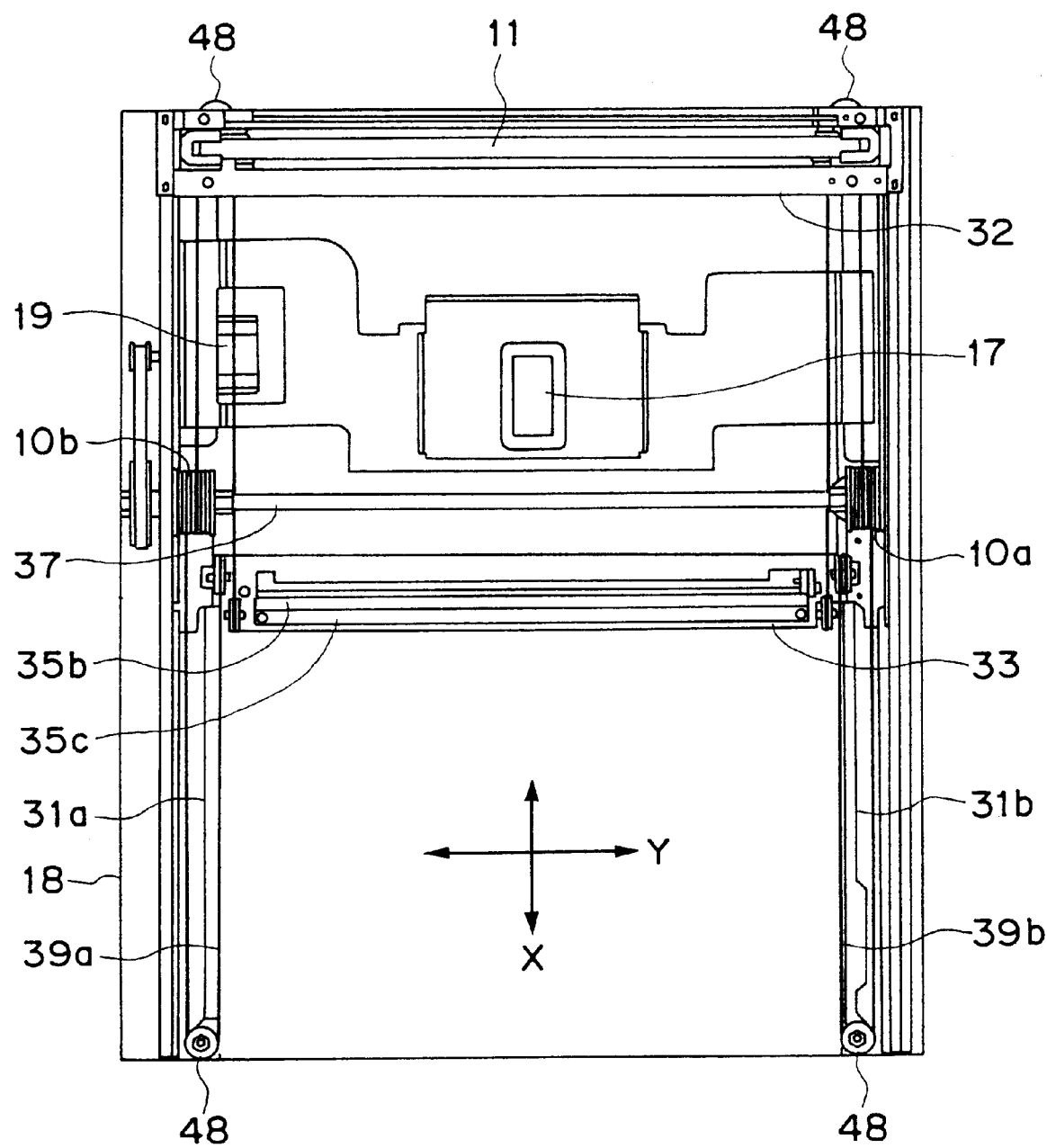
FIG. 1 is a top plan view of a book scanner, or image-scanning system, having a scanning table assembly according to an embodiment of the present invention.
Figure 2:
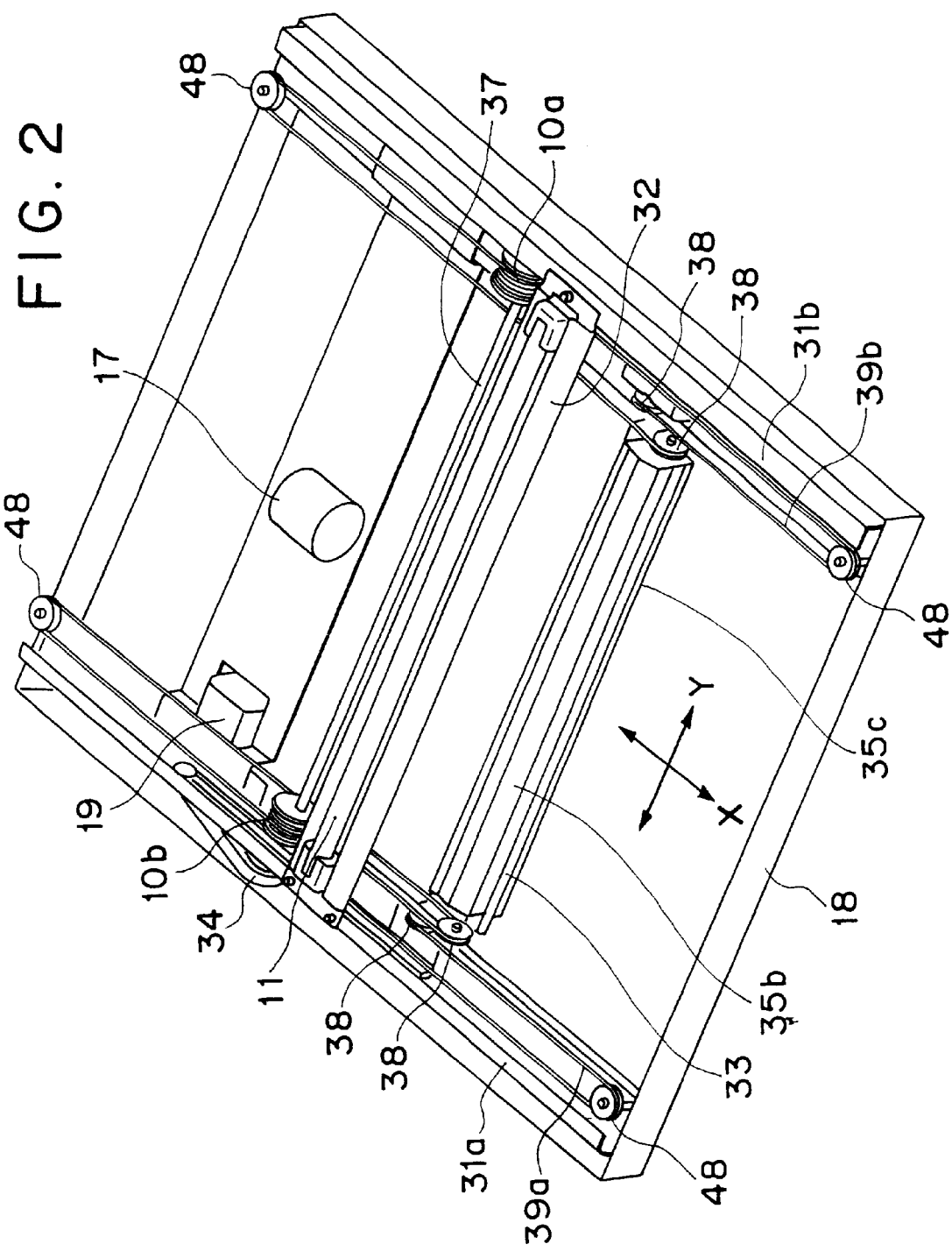
FIG. 2 is a perspective view of the book scanner of FIG. 1.
Figure 3:
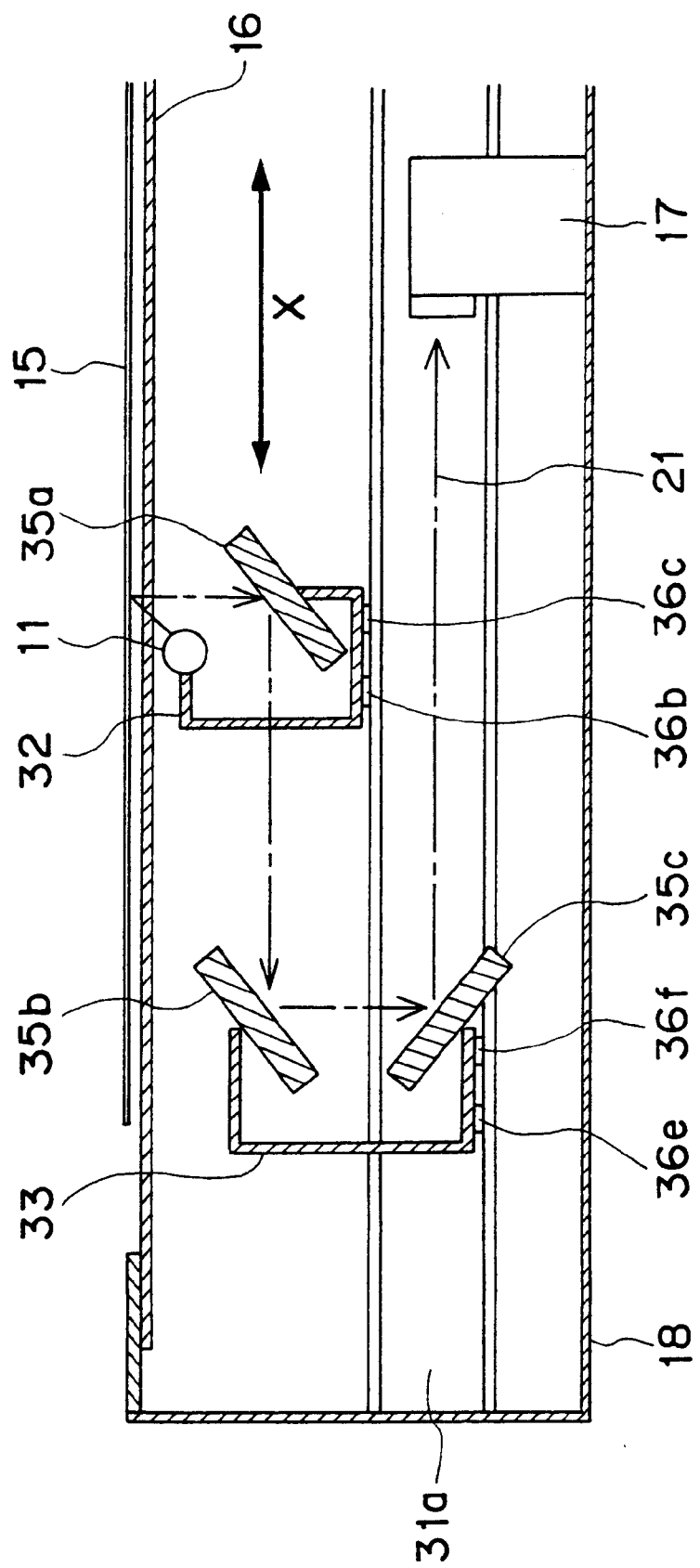
FIG. 3 is a longitudinal sectional view of the book scanner of FIG. 1 taken along the sub-scanning direction "Y" in FIG. 1.

Referring to FIGS. 1, 2 and 3, a book scanner, or image-scanning system, having a scanning table assembly according to an embodiment of the present invention is shown with a top cover thereof being omitted in the figures. The book scanner includes a housing 18 having a top glass stage 16 for mounting thereon a document (sheet) 15 to be subjected to image scanning by the book scanner. As clearly shown in FIG. 3, the housing 18 receives therein the scanning table assembly slidably disposed on a pair of rails 31a and 31b, and a CCD unit 17 for converting light image information into electric image information. The rails 31a and 31b are disposed below the glass stage 16 in the housing 18.

The scanning table assembly includes a full-speed scanning table 32 and a half-speed scanning table 33. The full-speed scanning table 32 is disposed on the pair of rails 31a and 31b, and moves along the sub-scanning direction "X". The full-speed scanning table 32 mounts thereon an elongate light source 11 for irradiating the document 15 uniformly in the main scanning direction "Y", and an elongate mirror 35a for reflecting the light reflected from the surface of the document 15 toward the half-speed scanning table 33.

The half-speed scanning table 33 also moves along the sub-scanning direction "X" at a speed which is half the speed of the full-speed scanning table 32 so that the path length of the light reflected from the document surface toward the CCD unit 17 is maintained substantially at a constant during the read operation of the book scanner.

The full-speed scanning table 32 is slidably disposed on the pair of rails 31a and 31b, and is coupled to a pair of wires 39a and 39b by a pair of metal fittings. The pair of wires 39a and 39b tag the full-speed scanning table 32 in the sub-scanning direction "X".

The half-speed scanning table 33 is slidably disposed on the pair of rails 31a and 31b for moving in the same direction as the direction of the movement of the full-speed scanning table 32. The half-speed scanning table 33 has two pairs of pulleys 38 fixed thereto, around which a pair of wires 39a and 39b are turned in the direction for moving the half-speed scanning table 33 in synchrony with the movement of the full-speed scanning table 32.

Figure 4:
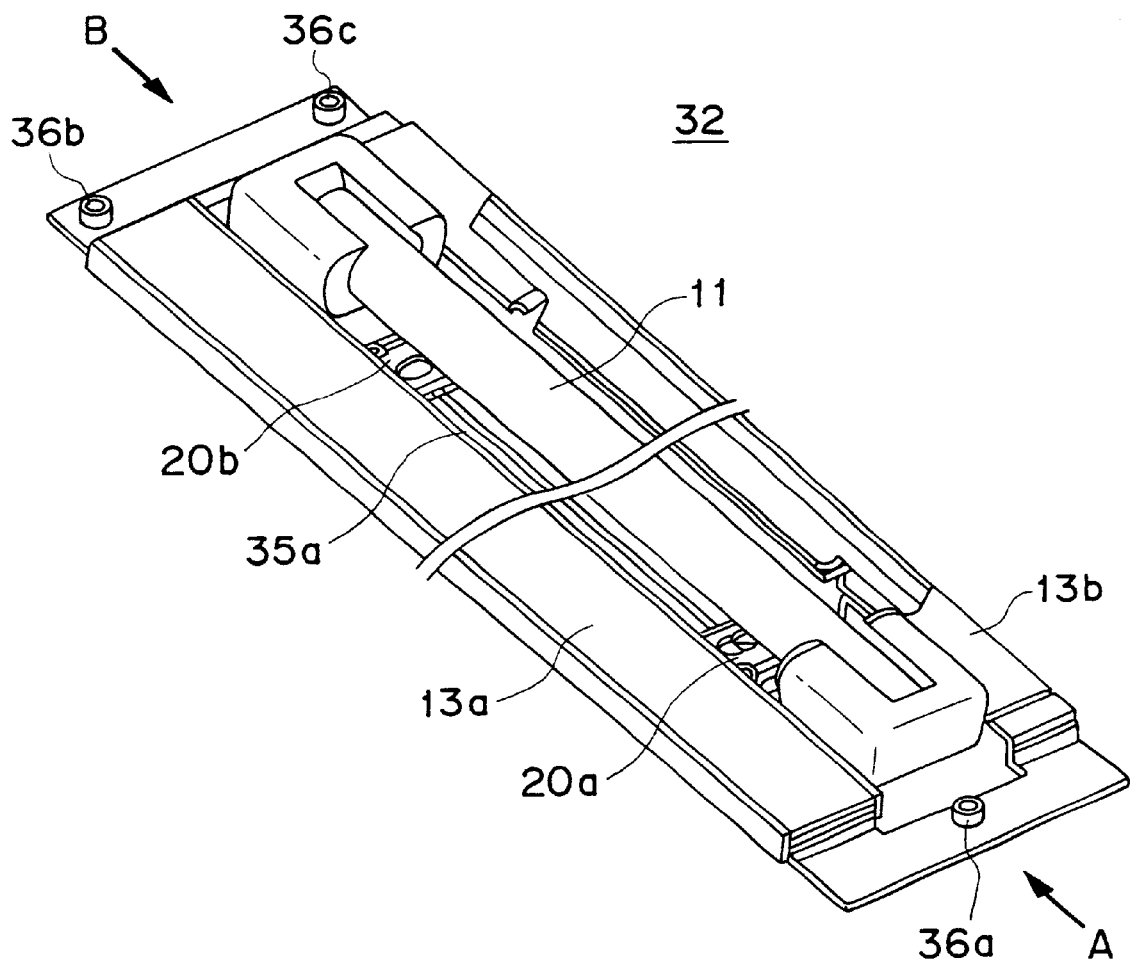
FIG. 4 is a perspective view of the full-speed scanning table shown in FIGS. 1 and 2.
Figure 6:
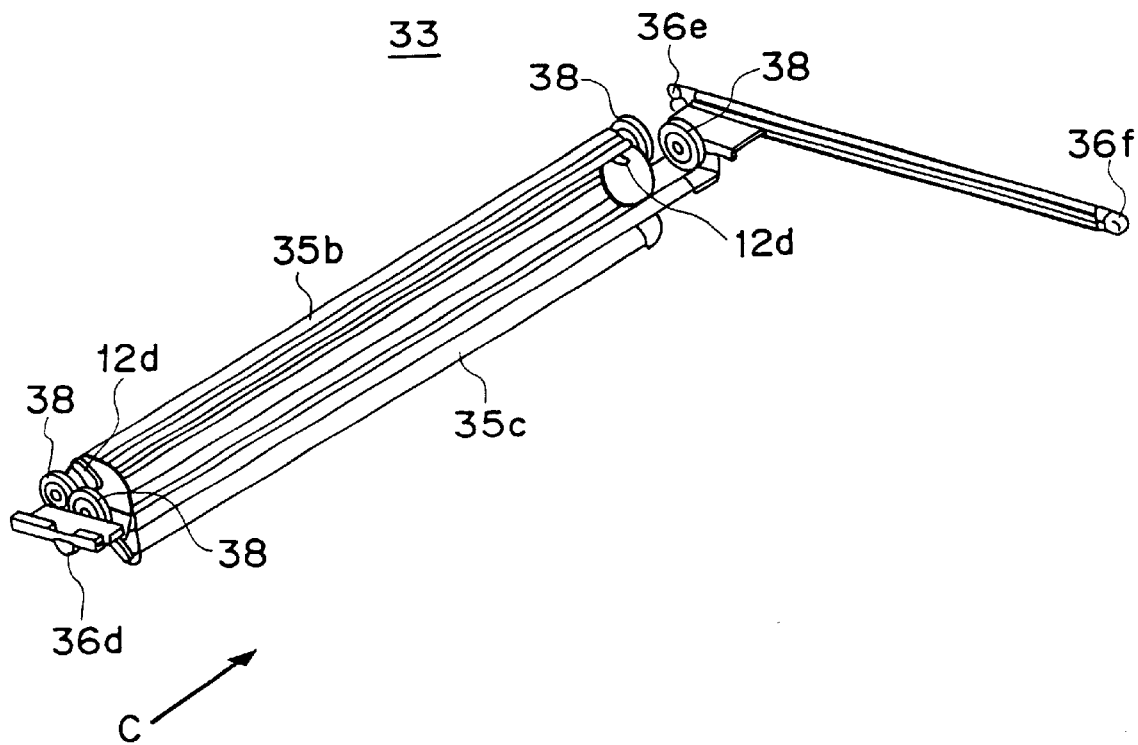
FIG. 6 is a perspective view of the half-speed scanning table shown in FIGS. 1 and 2.

Each of the tables 32 and 33, as shown in FIG. 4 and 6, has three sliders 36a, 36b and 36c or 36d, 36e and 36f, which slidably move the corresponding table on the rails 31a and 31b while contacting with three points of the rails 31a and 31b. The wires 39a and 39b are turned around fixed pulleys 48 fixed at four corners of the housing 18. The ends of both the wires 39a and 39b are fixed at respective drive pulleys 10a and 10b fixed onto a drive shaft 37 extending in the direction "Y". A drive unit 19 is fixed to the drive pulleys 10a and thus turns the same.

Figure 5A:
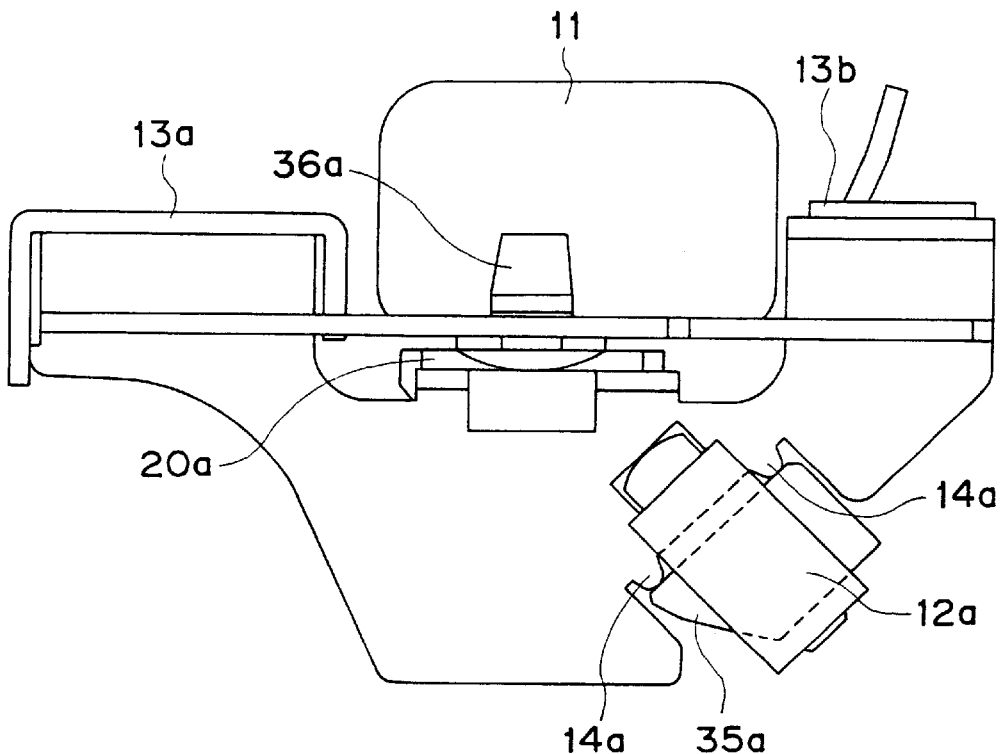
FIGS. 5A and 5B are end views of the full-speed scanning table of FIG. 4 as viewed along the directions of "A" and "B", respectively.
Figure 5B:
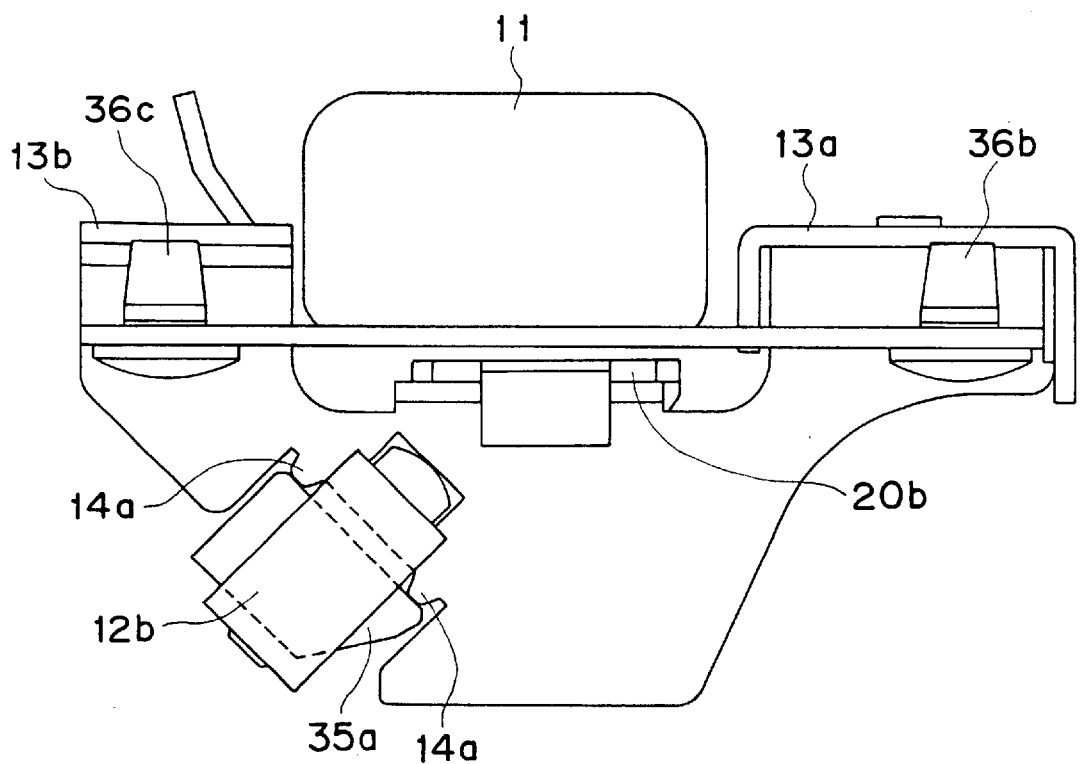

Referring to FIGS. 4, 5A and 5B showing the full-speed scanning table 32, the elongate light source 11 is fixed on the table 32 for irradiating the document 15 uniformly in the main scanning direction "Y", and the mirror 35a is also fixed onto four seats; 14a and 14b by using fittings 12a and 12b. The three-point support configuration of the full-speed scanning table 32 does not involve a distortion of the table 32, which in turn affords employment of a four-point support configuration for the elongate mirror 35a substantially without a distortion of the reflective surface of the elongate mirror 35a.

One of the ends of the full-speed scanning table 32 is fixed onto a pair of sliders 36b and 36c which slidably move on the rail 31a, whereas the other of the ends of the full-speed scanning table 32 is fixed onto a single slider 36a which slidably moves on the rail 31b. The single slider 36a is fixed on a line passing in the main scanning direction "Y" through the center of gravity of the full-speed scanning table 32. The three-point support configuration of the full-speed scanning table 32 affords a stable posture of the full-speed scanning table 32. The sliders 36a, 36b and 36c are made of a material that allows the sliders to smoothly slide on the rails 31a and 31b.

Figure 7:
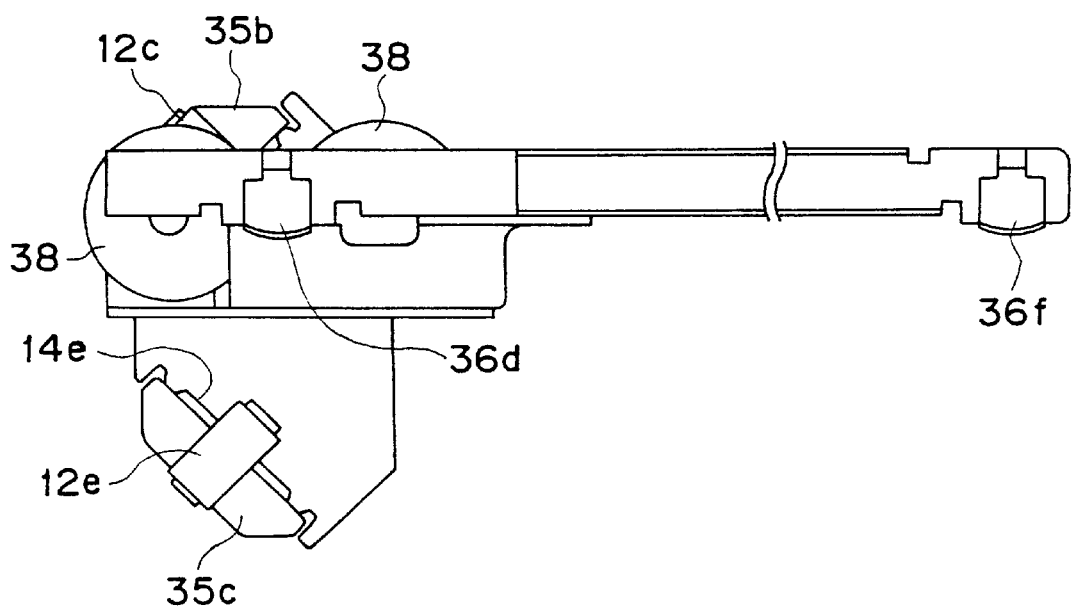
FIG. 7 is an end view of the half-speed scanning table of FIG. 6 as viewed along the direction "C".

Referring to FIGS. 6 and 7, the half-speed scanning table 33 mounts thereon a pair of elongate mirrors 35b and 35c, one of which is supported at four points of the table 33 and the other of which is supported at three points of the table 33. The fixing of the mirrors 35b and 35c are effected onto seats by using fittings 12c, 12d, 12e and 12f. The combination of a three-point support configuration and a four-point support configuration as used herein affords an excellent accuracy in the mechanical assembly of the system compared to a four-point support configuration for both the mirrors. In this respect, if both the mirrors 35b and 35c are supported at four points, one of the mirrors supported on the table 33 may cause a small distortion in the table 32, which in turn causes unstable fixing or distortion in the reflective surface of the other of the mirrors 35b and 34c fixed at four points depending on the accuracy of the dimensions or the fabrication of the mirrors and the table as well as the rigidity thereof.

One of the ends of the half-speed scanning table 33 is fixed onto a pair of sliders 36e and 36f which slidably move on the rail whereas the other of the ends of the half-speed scanning table 33 is fixed onto a single slider 36d which slidably moves on the rail, similarly to the full-speed scanning table 32. The single slider 36d is fixed to the half-speed scanning table 33 on a line passing in the main scanning direction "Y" through the center of gravity of the half-speed scanning table 33.

In operation of the book scanner of the present embodiment, a document 15 is placed on the glass stage 16 of the housing 18 for image-scanning of the document 15. The elongate light source 11 mounted on the full-speed scanning table 32 irradiates the document 15 uniformly in the main scanning direction "Y", whereby the light reflected from the document 15 is received by the CCD unit 17 through the mirror 35a on the full-speed scanning table 32 and the mirrors 35b and 35c on the half-speed scanning table 33. The CCD unit 17 converts the light image information from the document 15 into electric image information.

The full-speed scanning table 32 connected at both ends thereof to the wires 39a and 39b is tagged on the rails 31a and 31b in the sub-scanning direction "X" by the drive unit 19 which winds the wires 39a and 39b around the two pairs of pulleys 38.

More specifically, the drive unit 19 rotates the shaft 37 to drive the wires 39a and 39b which are wound around the drive pulleys 10a and 10b.

The rigidity of the mirrors 35a on the full-speed scanning table 32 is higher than the rigidity of the stays 13a and 13b. Thus, the fixing of the mirror 35a by using the fittings 14a and 14b onto the seats 12a and 12b affords an excellent accuracy of the angle of the reflective surface for the mirror 35a.

The three-point support of the tables 32 and 33 by using three sliders having a high sliding ability with respect to the rails 31a and 31b affords a stable posture of the tables 32 and 33, which in turn affords an excellent image quality obtained by the image-scanning system, or the book scanner, irrespective of the planarity of the rails 31a and 31b.

In the above configuration, it is preferable that the fittings for fixing the one of the mirrors 35b and 35c supported at three points of the half-speed scanning table 33 have a lower rigidity compared to those for fixing the other of the mirrors 35b and 35c supported at four points.

Figure 8:
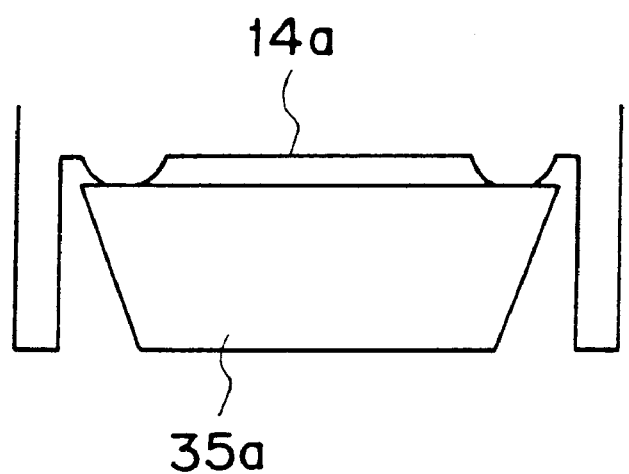
FIG. 8 is an end view of the mirror shown in FIG. 4.
Figure 9:
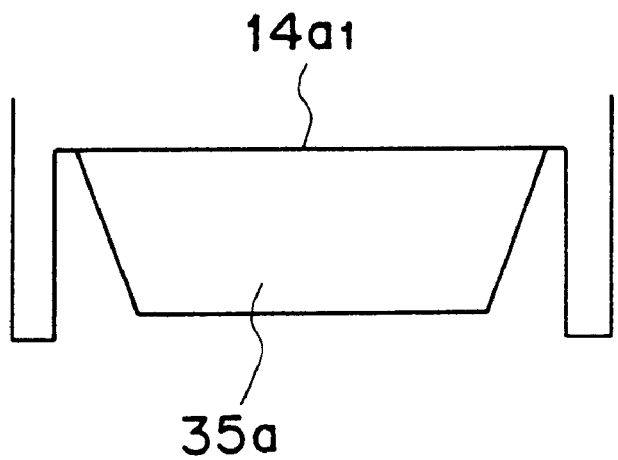
FIG. 9 is an end view of a modification of the fittings for the mirror of FIG. 8.

Referring to FIG. 8, the mirror 35a is fixed onto the seats 14a of the full-speed scanning table 32 at four points. In an alternative configuration of the above embodiment, as shown in FIG. 9, the mirror 35a may be fixed onto the seats 14b of the full-speed scanning table 32 at the full surface of the seats 14a1. In this configuration, a higher planarity is required for the surface of the seats 14a1.

Since the above embodiments are described only for examples, the present invention is not limited to the above embodiments and various modifications or alterations can be easily made therefrom by those skilled in the art without departing from the scope of the present invention.

What is claimed is:

1. A scanning table assembly for use in an image-scanning system which scans a document, the image-scanning assembly comprising:

a first scanning table having a light source which irradiates the document to be scanned and a first mirror which reflects light reflected from the document;

a second scanning table having second and third mirrors which consecutively reflect the light reflected from said first mirror;

at least one pair of rails; and a CCD unit;

wherein said first and second scanning tables move on said at least one pair of rails in association with each other so that a path length of the light reflected from the document to said CCD unit is constant, at least one of said first and second scanning tables being supported only at one point on one rail and only at two points spaced from one another on the other rail of one of said at least one pair of rails while said first and second scanning tables move on said at least one pair of rails.

2. The scanning table assembly as defined in claim 1, wherein said first mirror is supported on said first scanning table at four points of said first mirror.

3. The scanning table assembly as defined in claim 1, wherein at least one of said second and third mirrors is supported on said second scanning table at four points of said at least one of said second and third mirrors.

4. A scanning table assembly for use in an image-scanning system which scans a document, the image-scanning assembly comprising:

a first scanning table having a light source which irradiates the document to be scanned and a first mirror which reflects light reflected from the document;

a second scanning table having second and third mirrors which consecutively reflect the light reflected from said first mirror;

at least one pair of rails; and a CCD unit;

wherein said first and second scanning tables move on said at least one pair of rails in association with each other so that a path length of the light reflected from the document to said CCD unit is constant, at least one of said first and second scanning tables being supported only at one point on one rail and only at two points on the other rail of said at least one pair of rails while said first and second tables move along said at least one pair of rails, said one of said second and third mirrors being supported on said second scanning table at four points thereof whereas the other of said second and third mirrors is supported at three points thereof.

5. A scanning table assembly comprising:

a pair of rails;

a scanning table adapted to move along the pair of rails; and a plurality of spaced apart, one-point contact sliders mounted between the scanning table and the rails to slidably move the scanning table along the pair of rails, two of the one-point contact sliders being spaced from one another along one of the rails, and one another one-point contact slider sliding along the other rail, so that the scanning table has only three spaced apart contact points with the pair of rails while the scanning table moves along the pair of rails.

6. A scanning table assembly comprising:

a first pair of rails;

a first scanning table extending along a center axis and adapted to move along a path on the first pair of rails and having a center;

a second pair of rails; and a second scanning table adapted to move along the path on the second pair of rails, wherein the first scanning table is supported for movement along the first pair of rails at one point lying on the center axis on one rail of the first pair of rails and at two points spaced equidistantly in opposite directions from the center axis along the path on the other rail of the first pair of rails, and wherein the second scanning table is supported for movement along the second pair of rails only at one point on one rail of the second pair of rails and only at two spaced apart points on the other rail of the second pair of rails while the second scanning table moves along the second pair of rails.

7. The scanning table assembly as defined in claim 6, wherein the first scanning table includes a light source which irradiates light and a first mirror which reflects light.

8. The scanning table assembly as defined in claim 7, wherein the second scanning table includes a second mirror and a third mirror which consecutively reflect the light reflected from the first mirror.

9. The scanning table assembly as defined in claim 8, further comprising:

a CCD unit which receives the reflected light.

10. The scanning table assembly as defined in claim 9, wherein the first and the second scanning tables move along their respective pair of rails such that the reflected light maintains a substantially constant path length from the first mirror to the CCD unit.

11. The scanning table assembly as defined in claim 8, wherein at least one of the second and third mirrors is supported on the second scanning table at four points.

12. The scanning table assembly as defined in claim 7, wherein the first mirror is supported on the first scanning table at four points.

* * * * *